United States Patent
Benevelli et al.

(10) Patent No.: US 10,342,180 B2
(45) Date of Patent: Jul. 9, 2019

(54) REGENERATIVE HYDRAULIC BRAKE FOR A STUFFER UNIT IN AN AGRICULTURAL BALER

(71) Applicant: CNH Industrial America LLC, New Holland, PA (US)

(72) Inventors: Alessandro Benevelli, Albinea (IT); Riccardo Morselli, Modena (IT); Didier Verhaeghe, Ieper (BE)

(73) Assignee: CNH Industrial America LLC, New Holland, PA (US)

( * ) Notice: Subject to any disclaimer, the term of this patent is extended or adjusted under 35 U.S.C. 154(b) by 164 days.

(21) Appl. No.: 15/323,610

(22) PCT Filed: Jul. 7, 2015

(86) PCT No.: PCT/EP2015/065462
§ 371 (c)(1),
(2) Date: Jan. 3, 2017

(87) PCT Pub. No.: WO2016/005380
PCT Pub. Date: Jan. 14, 2016

(65) Prior Publication Data
US 2017/0135286 A1 May 18, 2017

(30) Foreign Application Priority Data
Jul. 9, 2014 (BE) .................................. 2014/0535

(51) Int. Cl.
*A01F 15/10* (2006.01)
*A01F 15/04* (2006.01)
*A01F 15/08* (2006.01)

(52) U.S. Cl.
CPC .............. *A01F 15/10* (2013.01); *A01F 15/04* (2013.01); *A01F 15/08* (2013.01); *A01F 15/101* (2013.01); *A01F 2015/102* (2013.01)

(58) Field of Classification Search
CPC ........ A01F 15/10; A01F 15/101; A01F 15/04; A01F 15/08; A01F 15/0825; A01F 15/148; A01F 2015/102; Y02E 60/15; A01D 69/00
USPC .................. 100/179, 188 R, 189; 56/341
See application file for complete search history.

(56) References Cited

U.S. PATENT DOCUMENTS

| | | | |
|---|---|---|---|
| 4,106,268 A | 8/1978 | White et al. | |
| 6,161,368 A | 12/2000 | Wilkens et al. | |
| 2013/0104512 A1* | 5/2013 | Duenwald | A01F 15/101 56/341 |

FOREIGN PATENT DOCUMENTS

| | | |
|---|---|---|
| EP | 2433485 A1 | 3/2012 |
| FR | 2882623 A1 | 9/2006 |

* cited by examiner

*Primary Examiner* — Shelley M Self
*Assistant Examiner* — Katie L. Parr
(74) *Attorney, Agent, or Firm* — Peter K. Zacharias; Patrick M. Sheldrake

(57) ABSTRACT

An agricultural baler includes a main bale chamber, a plunger, a gear box, and a stuffer unit. The plunger is reciprocally movable within the main bale chamber. The stuffer unit is driven by the plunger and the gear box, and is movable through a stuffer cycle for transferring crop material in charges into the main bale chamber. The agricultural baler further includes a hydraulic brake associated with and configured for acting as a brake on the stuffer unit during a portion of the stuffer cycle.

8 Claims, 3 Drawing Sheets

REGENERATIVE HYDRAULIC BRAKE FOR A STUFFER UNIT IN AN AGRICULTURAL BALER

CROSS REFERENCE TO RELATED APPLICATION

This application is the National Stage of International Application No. PCT/EP2015/065462 filed Jul. 7, 2015, which claims priority to Belgium Patent Application No. 2014/0535 filed Jul. 9, 2014, the contents of which are incorporated herein by reference.

FIELD OF THE INVENTION

The present invention relates to agricultural balers, and, more particularly, to brakes for stuffer units within such balers.

DESCRIPTION OF THE RELATED ART

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a duct or pre-compression chamber. The packer unit forms a wad of crop within the pre-compression chamber which is then transferred to a main bale chamber. (For purposes of discussion, the charge of crop material within the pre-compression chamber will be termed a "wad", and the charge of crop material after being compressed within the main bale chamber will be termed a "flake"). Typically such a packer unit includes packer tines or forks to move the crop material from the pickup unit into the pre-compression chamber. Instead of a packer unit it is also known to use a rotor cutter unit which chops the crop material into smaller pieces.

A stuffer unit transfers the wad of crop material in charges from the pre-compression chamber to the main bale chamber. Typically such a stuffer unit includes stuffer forks which are used to move the wad of crop material from the pre-compression chamber to the main bale chamber, in sequence with the reciprocating action of a plunger within the main bale chamber.

In the main bale chamber, the plunger compresses the wad of crop material into flakes to form a bale and, at the same time, gradually advances the bale toward the outlet of the bale chamber. The plunger reciprocates, back and forth, toward and away from the discharge end of the baler. The plunger may include a number of rollers which extend laterally outward from the sides of the plunger. The rollers on each side of the plunger are received within a respective plunger slot formed in the side walls of the bale chamber, with the plunger slots guiding the plunger during the reciprocating movements.

When enough flakes have been added and the bale reaches a full (or other predetermined) size, a number of knotters are actuated which wrap and tie twine, cord or the like around the bale while it is still in the main bale chamber. The twine is cut and the formed baled is ejected out the back of the baler as a new bale is formed.

A stuffer unit as described above may include a passive brake on the stuffer shaft in order to brake the stuffer unit during the last phase of the stuffer cycle. Such a brake may include a disc braking system with one or more discs which are concentric with the stuffer shaft. The stuffer shaft is always braked during the entire stuffer cycle, not just the last phase of the cycle. Therefore, the stuffer unit must be driven with enough force to not only drive the stuffer unit itself, but also with enough force to overcome the braking force of the passive brake. The brake therefore results in additional power consumption and generation of heat.

What is needed in the art is an agricultural baler which effectively brakes the stuffer unit during the last phase of the stuffer cycle, but does not brake the stuffer unit during all of the stuffer cycle.

SUMMARY OF THE INVENTION

The present invention provides an agricultural baler with a regenerative hydraulic brake (RHB) which brakes the stuffer unit during the end of the stuffer cycle, and concurrently stores hydraulic energy for use during a subsequent braking operation.

The invention in one form is directed to an agricultural baler including a main bale chamber, a plunger, a gear box and a stuffer unit. The plunger is reciprocally movable within the main bale chamber. The gearbox is coupled with the plunger for reciprocally moving the plunger within the main bale chamber. The stuffer unit is driven by the plunger and/or the gearbox, and is movable through a stuffer cycle for transferring crop material in charges into the main bale chamber. The agricultural baler is characterized by a hydraulic brake associated with and configured for acting as a brake on the stuffer unit during a portion of the stuffer cycle.

An advantage of the present invention is that the efficiency of the stuffer unit is improved, thus improving the overall efficiency of the baler.

Another advantage is that braking energy is recovered for use during a subsequent braking operation.

Yet another advantage is that heat generation is minimized with the hydraulic brake of the present invention.

A further advantage is that no electronic controls or actuators are needed.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
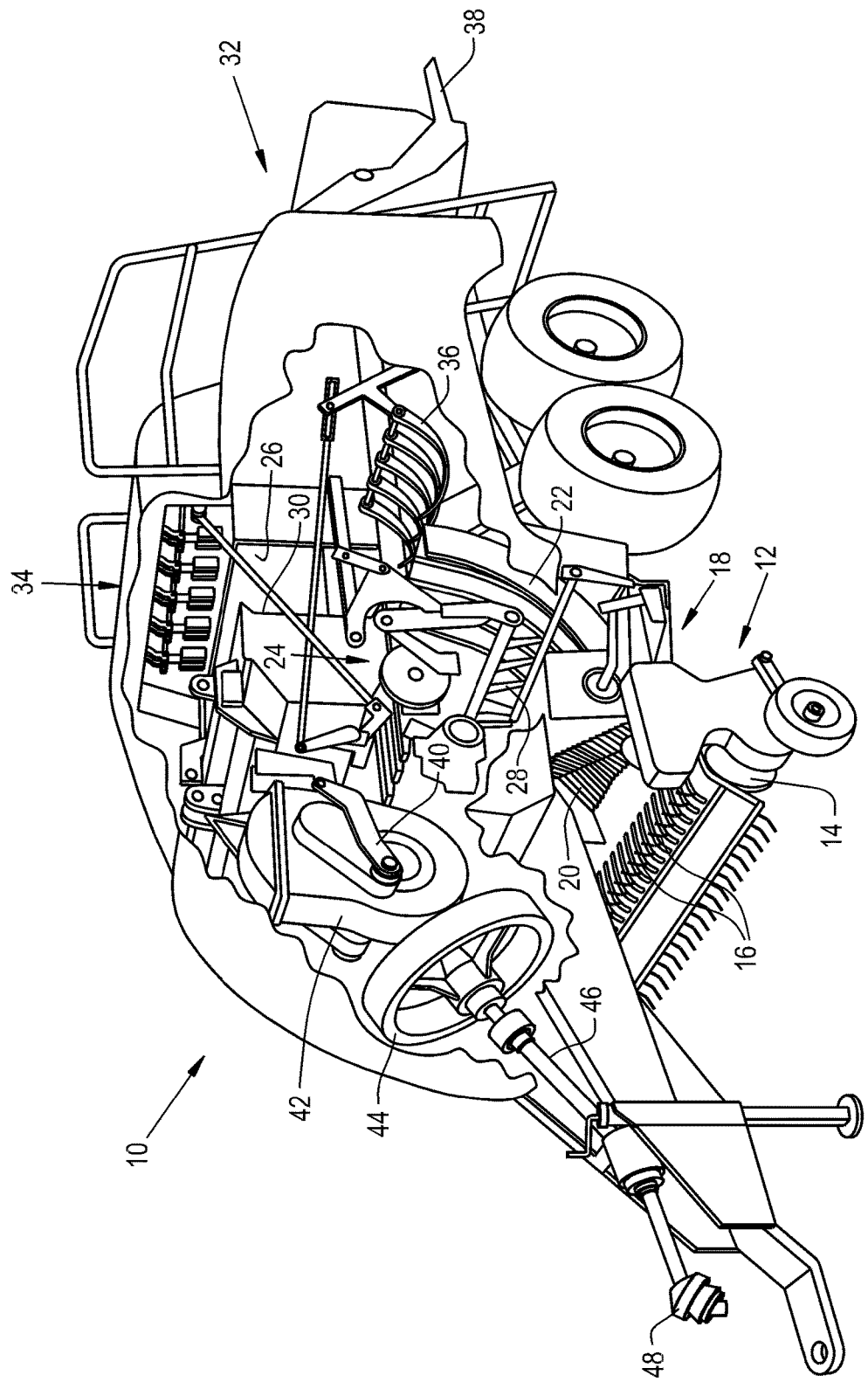
FIG. 1 is a perspective cutaway view showing the internal workings of a large square baler, which may include an RHB of the present invention.

Referring now to the drawings, and more particularly to FIG. 1, there is shown a perspective cutaway view showing the internal workings of a large square baler 10. Baler 10 operates on a two stage feeding system. Crop material is lifted from windrows into the baler 10 using a pickup unit 12. The pickup unit 12 includes a rotating pickup roll 14 with tines 16 which move the crop rearward toward a packer unit 18. An optional pair of stub augers (one of which is shown, but not numbered) are positioned above the pickup roll 14 to move the crop material laterally inward. The packer unit 18 includes packer tines 20 which push the crop into a pre-compression chamber 22 to form a wad of crop material. The packer tines 20 intertwine the crop together and pack the crop within the pre-compression chamber 22. Pre-compression chamber 22 and packer tines 20 function as the first stage for crop compression. Once the pressure in the pre-compression chamber 22 reaches a predetermined sensed value, a stuffer unit 24 moves the wad of crop from the pre-compression chamber 22 to a main bale chamber 26. The stuffer unit 24 includes stuffer forks 28 which thrust the wad of crop directly in front of a plunger 30, which reciprocates within the main bale chamber 26 and compresses the wad of crop into a flake. Stuffer forks 28 return to their original stationary state after the wad of material has been moved into the main bale chamber 26. Plunger 30 compresses the wads of crop into flakes to form a bale and, at the same time, gradually advances the bale toward outlet 32 of main bale chamber 26. Main bale chamber 26 and plunger 30 function as the second stage for crop compression. When enough flakes have been added and the bale reaches a full (or other predetermined) size, knotters 34 are actuated which wrap and tie twine around the bale while it is still in the main bale chamber 26. Needles 36 bring the lower twine up to the knotters 34 and the tying process then takes place. The twine is cut and the formed bale is ejected from a discharge chute 38 as a new bale is formed.

Plunger 30 is connected via a crank arm 40 with a gear box 42. Gear box 42 is driven by a flywheel 44, which in turn is connected via a drive shaft 46 with the power take-off (PTO) coupler 48. The PTO coupler 48 is detachably connected with the PTO spline at the rear of the traction unit, such as a tractor (not shown).

Figure 2:
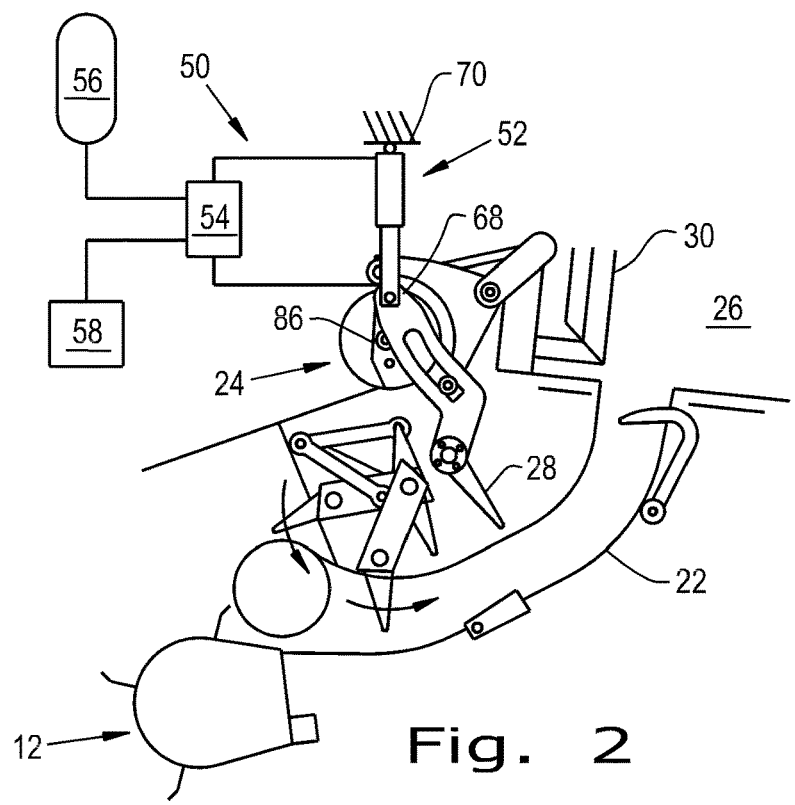
FIG. 2 is a side sectional view of the pre-compression chamber and stuffer unit in the baler of FIG. 1, with an embodiment of an RHB of the present invention.
Figure 3:
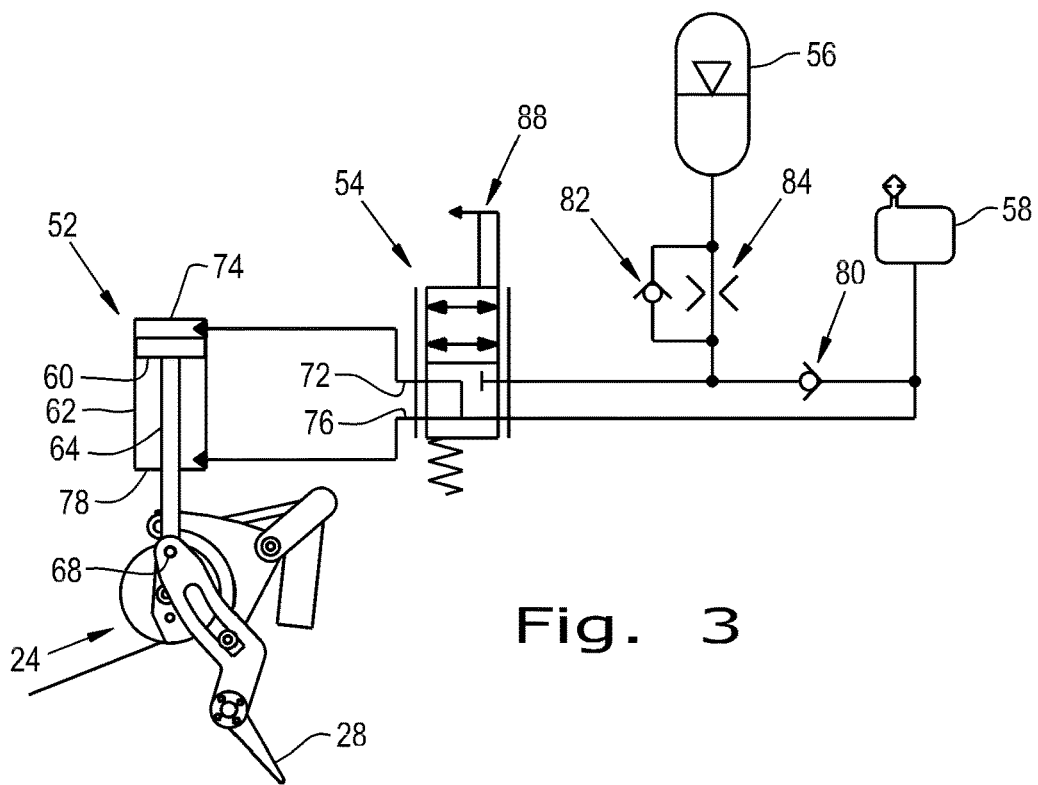
FIG. 3 is a side sectional view of the stuffer unit shown in FIGS. 1 and 2, coupled with a schematic view of an embodiment of an RHB of the present invention.

According to an aspect of the present invention, and referring now to FIGS. 2 and 3, an RHB 50 allows recovery of some of the braking energy used in braking the stuffer unit 24 during a portion of the stuffer cycle, and then provides this energy during the next braking phase of the stuffer cycle. In general, the RHB 50 includes a hydraulic cylinder assembly 52, valve 54, hydraulic accumulator 56 and tank 58. The hydraulic cylinder assembly 52 is configured as a 2 way cylinder arrangement with a piston 60 which is reciprocally movable within a cylinder 62. A piston rod 64 is connected to the piston 60 at one end thereof, and has an opposite end which extends longitudinally from the cylinder 62. The hydraulic cylinder assembly 52 is coupled with the stuffer unit 24 in a manner that slidingly moves the piston 60 within the cylinder 62 during operation through a stuffer cycle. More particularly, the hydraulic cylinder assembly 52 is connected at one end with a stuffer pin 68, and is connected at an opposite end with the frame 70 of the baler 10. In the embodiment shown, the top end of the cylinder 62 is connected with the frame 70 and the bottom end of the piston rod 64 is connected with the stuffer pin 68; however, the orientation of the hydraulic cylinder assembly 52 may be reversed.

The valve 54 in one position allows communication between the piston head side of the cylinder 62 and the accumulator 56 (during boost and braking phases), and the piston rod side of the cylinder 62 and the tank 58 to avoid cavitation. In the other position, the valve 54 allows the piston 60 to be placed in a regenerative configuration (neutral, no braking force). The valve 54 includes a first port 72 which connects with a first end 74 (piston head side) of the cylinder 62, and a second port 76 which connects with a second end 78 (piston rod side) of the cylinder 62.

A first check valve 80 between the tank 58 and valve 54 allows cavitation to be avoided during the transition between the boost phase and the neutral phase. A second check valve 82 between the accumulator 56 and valve 54 manages the braking force that is applied to the stuffer unit 24 using an orifice 84 that it is by-passed during the boost phase.

Figure 4:
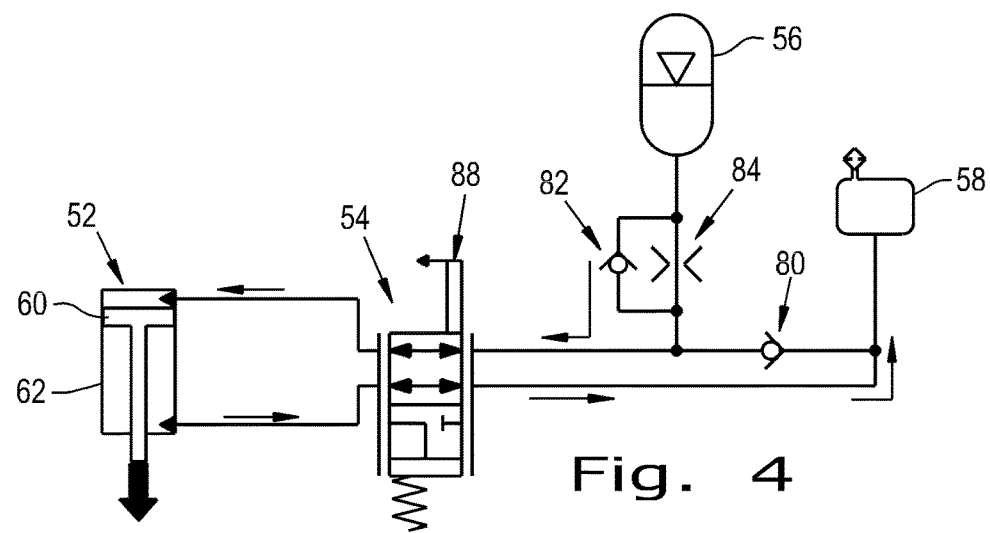
FIG. 4 is a schematic view of the RHB shown in FIG. 3, when in a boost phase.

Starting from the top dead center (TDC) position with the stuffer pin located at the top of the stuffer unit (as shown in FIG. 3), the three main phases of the RHB 50 can be explained as follows:

Boost phase (FIG. 4): The pressurized hydraulic oil stored inside the accumulator 56 from the previous cycle, pushes against the head of the piston 60 within the cylinder 62. When the stored energy is finished, the valve 54 switches in order to put the piston 60 in a regenerative configuration. During this transition the piston 60 can draw oil from the tank 58 due to the check valve 80.

Figure 5:
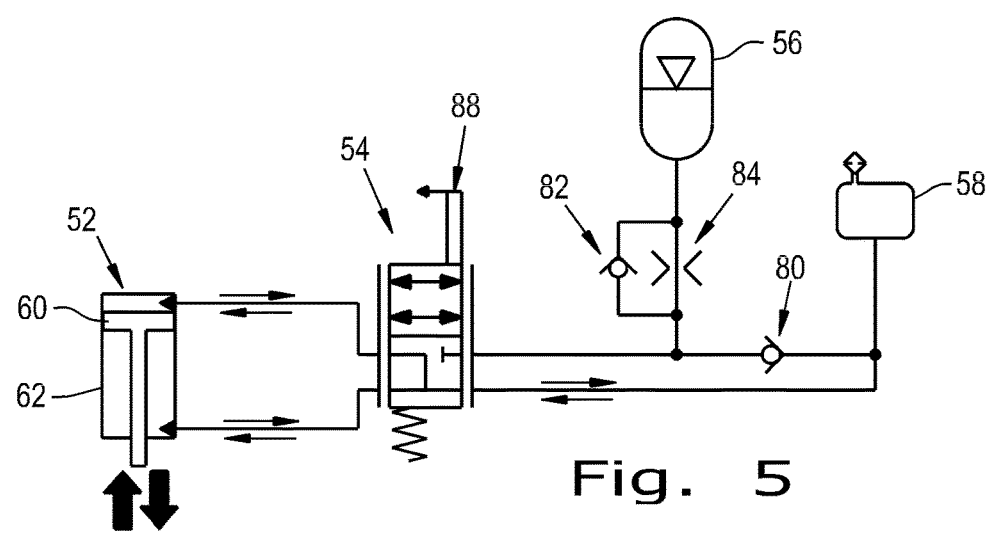
FIG. 5 is a schematic view of the RHB shown in FIG. 3, when in a neutral phase.

Neutral phase (FIG. 5): The stuffer unit 24 is driven by the center stuffer shaft 86 (FIG. 2) without any braking force during a non-braking portion of the stuffer cycle. The hydraulic piston 60 is in a regenerative configuration, and oil can be drawn from the tank 58.

Figure 6:
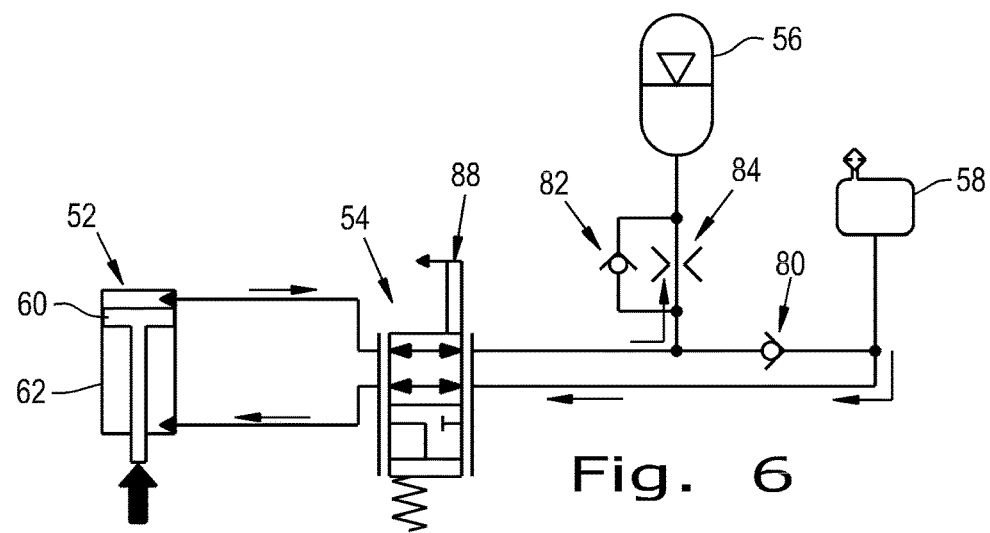
FIG. 6 is a schematic view of the RHB shown in FIG. 3, when in a braking phase.

Braking phase (FIG. 6): The stuffer unit 24 is selectively and intermittently braked during the portion of the stuffer unit cycle prior to the stuffer unit 24 reaching the end stroke position. The valve 54 is switched and the piston head side of the cylinder chamber is fluidly coupled with the accumulator 56. The orifice 84 introduces a dynamic contribution of braking force and also smoothes the transient. Between two consecutive cycles, the valve 54 is switched in order to avoid oil flow-back. In order to have a synchronized system, the valve actuation can be made by a mechanical actuator 88 (shown schematically in FIGS. 3-6; e.g., using levers, since mechanical actuation is suitable for this kind of application). The piston geometry (i.e., area ratio on opposite sides of the piston) also maximizes the boost phase with respect to the braking phase. The hydraulic braking system/principle is suitable also in case more than one braking phase is needed. This can be achieved through a detailed design of the mechanical actuator lever in order to synchronize all the different valve switching phases. Alternatively, the valve 54 could also be controlled using an actuator in the form of an electrical processing circuit, such as a controller.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An agricultural baler, comprising:
a main bale chamber;
a plunger reciprocally movable within the main bale chamber;
a gearbox coupled with the plunger for reciprocally moving the plunger within the main bale chamber;
a stuffer unit driven by at least one of the plunger and the gearbox, the stuffer unit being movable through a stuffer cycle for transferring crop material in charges into the main bale chamber; and
a regenerative hydraulic brake which is configured for being charged during a portion of the stuffer cycle, the regenerative hydraulic brake associated with and configured for acting as a brake on the stuffer unit during a portion of the stuffer cycle; wherein the regenerative hydraulic brake includes a hydraulic cylinder assembly and a hydraulic accumulator, the hydraulic cylinder assembly includes a cylinder and a piston reciprocally disposed within the cylinder, and the hydraulic cylinder assembly is coupled with the stuffer unit in a manner that slidingly moves the piston within the cylinder during operation through a stuffer cycle.

2. The agricultural baler of claim 1, wherein the baler includes a frame and the hydraulic cylinder assembly includes a piston rod connected to the piston, and wherein the hydraulic cylinder is connected to the stutter unit or the frame, and the piston rod is connected to the other of the stuffer unit or frame.

3. The agricultural baler of claim 2, wherein the hydraulic cylinder is a 2 way cylinder, and further including a valve with a first port which interconnects a first end of the hydraulic cylinder with the accumulator and a second port which interconnects a second end of the hydraulic cylinder with a tank, and further including an actuator which is coupled with and operable to control operation of the valve.

4. The agricultural baler of claim 3, wherein the actuator is operable to control the valve whereby the first end or the second end of the hydraulic cylinder is selectively interconnected with the tank.

5. The agricultural baler of claim 2, wherein the stuffer unit includes a stuffer pin and the hydraulic cylinder assembly is pivotally connected to the stuffer pin.

6. The agricultural baler of claim 1, wherein the baler is a square baler.

7. A method of operating an agricultural baler, the baler including a main bale chamber, a plunger reciprocally movable within the main bale chamber, a gearbox coupled with the plunger for reciprocally moving the plunger within the main bale chamber, and a stuffer unit driven by at least one of the plunger and the gearbox, the method comprising the steps of:
moving the stuffer unit through a stuffer cycle for transferring crop material in charges into the main bale chamber; and
braking the stuffer unit during a portion of the stuffer cycle using a hydraulic brake; and
delivering power to the stuffer unit during another portion of the stuffer cycle using the hydraulic brake.

8. The method of claim 7, wherein the braking step includes selectively and intermittently braking the stuffer unit.

* * * * *